United States Patent
Mori et al.

(10) Patent No.: US 6,788,382 B2
(45) Date of Patent: Sep. 7, 2004

(54) MOVING PICTURE CODING CONTROL APPARATUS, AND MOVING PICTURE CODING CONTROL DATA GENERATING APPARATUS

(75) Inventors: Masashi Mori, Tokyo (JP); Kunio Nakaoka, Tokyo (JP); Hiroaki Sakai, Tokyo (JP); Yoshinari Sugegaya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 112 days.

(21) Appl. No.: 10/222,916

(22) Filed: Aug. 19, 2002

(65) Prior Publication Data

US 2003/0174287 A1 Sep. 18, 2003

(30) Foreign Application Priority Data

Mar. 13, 2002 (JP) ........................................ 2002-069099

(51) Int. Cl.[7] .............................. H04N 3/22; G06T 1/00
(52) U.S. Cl. ........................ 352/244; 348/745; 345/501
(58) Field of Search .......................... 345/87, 501, 506, 345/605; 352/244; 348/745

(56) References Cited

U.S. PATENT DOCUMENTS 6,091,767 A    7/2000 Westerman
6,456,340 B1 *  9/2002 Margulis ..................... 348/745
6,625,667 B1 *  9/2003 Westerman ..................... 710/5

FOREIGN PATENT DOCUMENTS

| JP | 09-055926 | 2/1997 |
|---|---|---|
| JP | 09-275550 | 10/1997 |
| JP | 2001-045436 | 2/2001 |
| JP | 2001-061148 | 3/2001 |
| JP | 2001-212649 | 7/2001 |
| JP | 2001-352542 | 12/2001 |
| JP | 2001-525131 | 12/2001 |

* cited by examiner

Primary Examiner—Russell Adams
Assistant Examiner—Arthur A Smith
(74) Attorney, Agent, or Firm—Burns, Doane, Swecker & Mathis, L.L.P.

(57) ABSTRACT

In a moving picture coding control apparatus, optimum relationships between local features and local coding parameters that are necessary to optimize ranges of global coding parameters are stored, for each optimum range of global coding parameters capable of reproducing a moving picture that reflects characteristics of display units which display moving picture data and opinions from a plurality of users. Optimum local coding parameters are sequentially selected for global coding parameters and local features by using the store data. Moving picture data is coded based on the selected local coding parameters.

9 Claims, 9 Drawing Sheets

DISPLAY UNIT (FOR TYPE 1)

| PICTURE SIZE(inch) | aa~bb | cc~dd | ... |
|---|---|---|---|
| PICTURE RESOLUTION (pixel×line) | xxx × yyy~zzz × www | Uuu×vvv | ... |
| FRAME RATE(fps) | 11~mm | nn ~ rr | ... |
| BIT RATE(Kbps) | ppp~qqq | sss ~ ttt | ... |

DISPLAY UNIT (FOR TYPE 2)

| PICTURE SIZE(inch) | aa~bb | cc~dd | ... |
|---|---|---|---|
| PICTURE RESOLUTION (pixel×line) | xxx × yyy~zzz × www | Uuu×vvv | ... |
| FRAME RATE(fps) | 11~mm | nn ~ rr | ... |
| BIT RATE(Kbps) | ppp~qqq | sss ~ ttt | ... |

⋮

DISPLAY UNIT (FOR TYPE N)

| PICTURE SIZE(inch) | aa~bb | cc~dd | ... |
|---|---|---|---|
| PICTURE RESOLUTION (pixel×line) | xxx × yyy~zzz × www | Uuu×vvv | ... |
| FRAME RATE(fps) | 11~mm | nn ~ rr | ... |
| BIT RATE(Kbps) | ppp~qqq | sss ~ ttt | ... |

FIG.7

| PICTURE SIZE(inch) | 1.5~2 | 2~2.5 | 2.5~3 |
|---|---|---|---|
| PICTURE RESOLUTION | SQVGA~QCIF | QCIF~HQVGA | HQVG~CIF |
| FRAME RATE(fps) | 8~15 | 10~15 | 10~20 |
| BIT RATE(Kbps) | 32~128 | 64~256 | 128~512 |

MOVING PICTURE CODING CONTROL APPARATUS, AND MOVING PICTURE CODING CONTROL DATA GENERATING APPARATUS

FIELD OF THE INVENTION

The present invention relates to a technology for producing a moving picture of a satisfactory picture quality that reflects characteristics of display units and opinions from users.

BACKGROUND OF THE INVENTION

In the moving picture coding system like the MPEG, it is essential to perform an optimum control of coding parameters. This is essential in order to provide users with a high-quality picture reproduction service with small quantity of moving picture data, or in order to obtain a high-quality picture in a portable moving-picture reproduction terminal that has a limited data storage capacity.

According to a conventional optimization method for optimizing coding parameters, much attention has not been paid to the characteristics of display units which display moving pictures. Instead, coding parameters have been optimized frequently. Those optimized coding parameters include a frame rate (fps: frame per second), a data rate (bps: bit per second), resolution (HXC: line per pixel), a quantization level after a discrete cosine conversion, a macro block type, a macro block pattern (CBP: coded patter block), and a motion vector detection mode.

There exist various types of displays which display moving pictures. Examples of such displays are cathode ray tubes (CRT's) and TFT type liquid crystal displays (LCD's), STN type LCD's, low-temperature polysilicone type LCD's, and plasma displays. Each display unit provides a unique display different from displays of other types of display units. However, according to the conventional technique, coding parameters of each display unit have not been sufficiently optimized.

According to the conventional technique, the coding control of the moving picture coding apparatuses have not sufficiently reflected users' feelings and preference about pictures reproduced from these apparatuses. Therefore, the picture quality of moving pictures has not been sufficiently optimized for the users.

According to the conventional technique, in coding moving pictures, frequently, coding parameters such as a frame rate and a bit rate have always been constant regardless of the screen size (inch) of the display unit. Therefore, there have been many problems. For example, the picture quality of the reproduced picture is not good, and the motion of the moving picture cannot be sufficiently recognized because of a low frame rate. Further, as the bit rate is higher than is necessary, the time allowance for recording on a recording medium becomes short.

SUMMARY OF THE INVENTION

It is an object of the present invention to provide a moving picture coding control apparatus capable of achieving a satisfactory reproduction of moving pictures reflecting characteristics of display units which display moving picture data and opinions from a plurality of users, through the optimization of coding parameters of a moving picture coding apparatus by reflecting the display unit characteristics and user opinions and evaluations.

It is another object of the present invention to provide a moving picture coding control database generating apparatus capable of generating a database of coding parameters to make it possible to achieve a satisfactory reproduction of moving pictures reflecting characteristics of display units which display moving picture data and opinions from a plurality of users.

Other objects and features of this invention will become apparent from the following description with reference to the accompanying drawings.

DETAILED DESCRIPTIONS

Embodiments of the moving picture coding control apparatus and the moving picture coding control database generating apparatus relating to the present invention will be explained in detail below with reference to the accompanying drawings.

Figure 2:
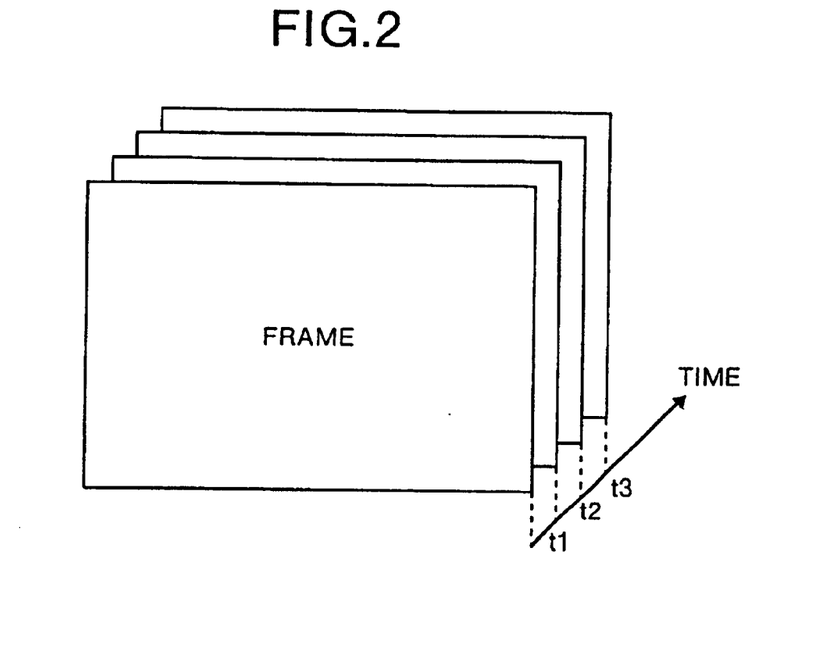
FIG. 2 is a diagram which shows the concept of frames of a moving picture.
Figure 3:
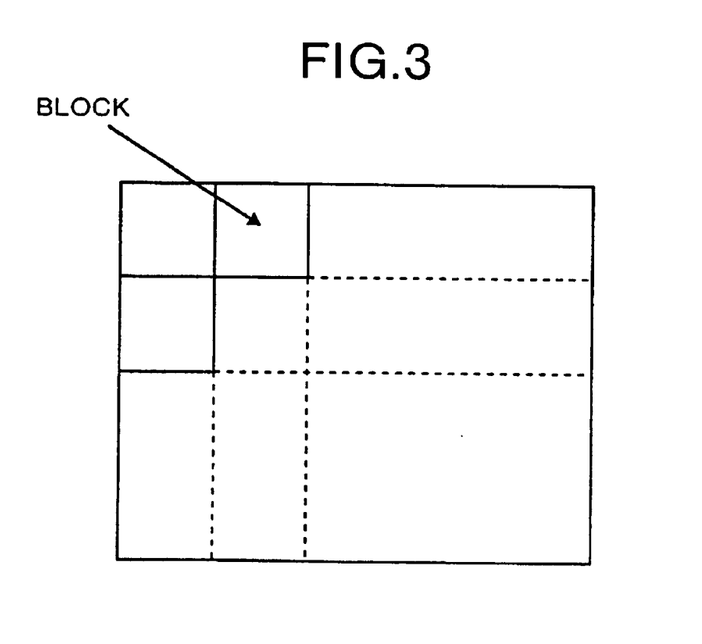
FIG. 3 is a diagram which shows the concept of blocks within a moving picture frame.

To begin with, definitions of terms used in this specification will be explained. In the moving picture coding apparatus, most coding systems execute coding in the units of frames and blocks. A moving picture can be regarded as a series of still pictures at predetermined time intervals (constant time, frequently). Each image picked-up still picture as shown in FIG. 2 is called a frame. Each frame is further divided into squares of the same sizes as shown in FIG. 3. This square is called a block. Coding is performed in this block unit. A method of dividing blocks and a name of a block are different between coding systems. For example, in the MPEG system, a block is called a macro block, and this substantially becomes a coding processing unit.

In the moving picture coding apparatus, it is necessary to statically assign several coding parameters, or dynamically assign several coding parameters for controlling the operation in the middle of motions. In this way, the coding parameters are divided into global coding parameters and local coding parameters.

Global coding parameters are defined as coding parameters that statically determine a policy of coding as a whole. The global coding parameters include an average frame rate (fps: frame per second), a data rate (bps: bit per second), and resolution (HXV (line×pixel)).

Local coding parameters are defined as coding parameters that are dynamically changed in a block unit during a coding operation. Taking the MPEG system as an example, the local coding parameters include a quantization level of a quantization carried out after a discrete cosine conversion, a macro block type, a macro block pattern (CBP: coded block pattern), and an optimum motion vector after an evaluation. The local coding parameters usually include a plurality of parameters. In the coding system like the MPEG, there is no rule of a change setting method for local coding parameters. However, several standard control procedures are provided as reference installation.

A local feature (hereinafter to be simply referred to as a feature) is defined as a quantity that becomes a standard for dynamically setting local coding parameters. For example, in a motion compensation coding system, a motion vector search processing is executed to search for a motion vector that represents a position at which a block error (a sum of absolute differentials between pixels) is smallest between a current frame and an adjacent frame of blocks. A local feature refers to this motion vector or the error (a sum of absolute differentials between pixels) for obtaining the motion vector.

Other examples of local features and local coding parameters corresponding to these local features will be listed below.

A "total sum of absolute values of AC components after a DCT" is a local feature. A local coding parameter corresponding to this local feature is a "quantization level".

A "difference between a current block and an adjacent block at the same positions" is a local feature. A local coding parameter corresponding to this local feature is a "macro block type".

A "minimum difference between blocks in the motion vector search processing and a vector that shows this position" is a local feature. A local coding parameter corresponding to this local feature is a "macro block type".

A "total sum of absolute values of DCT coefficients after a quantization processing" is a local feature. A local coding parameter corresponding to this local feature is a "CBP" (coded block pattern)).

Figure 1:
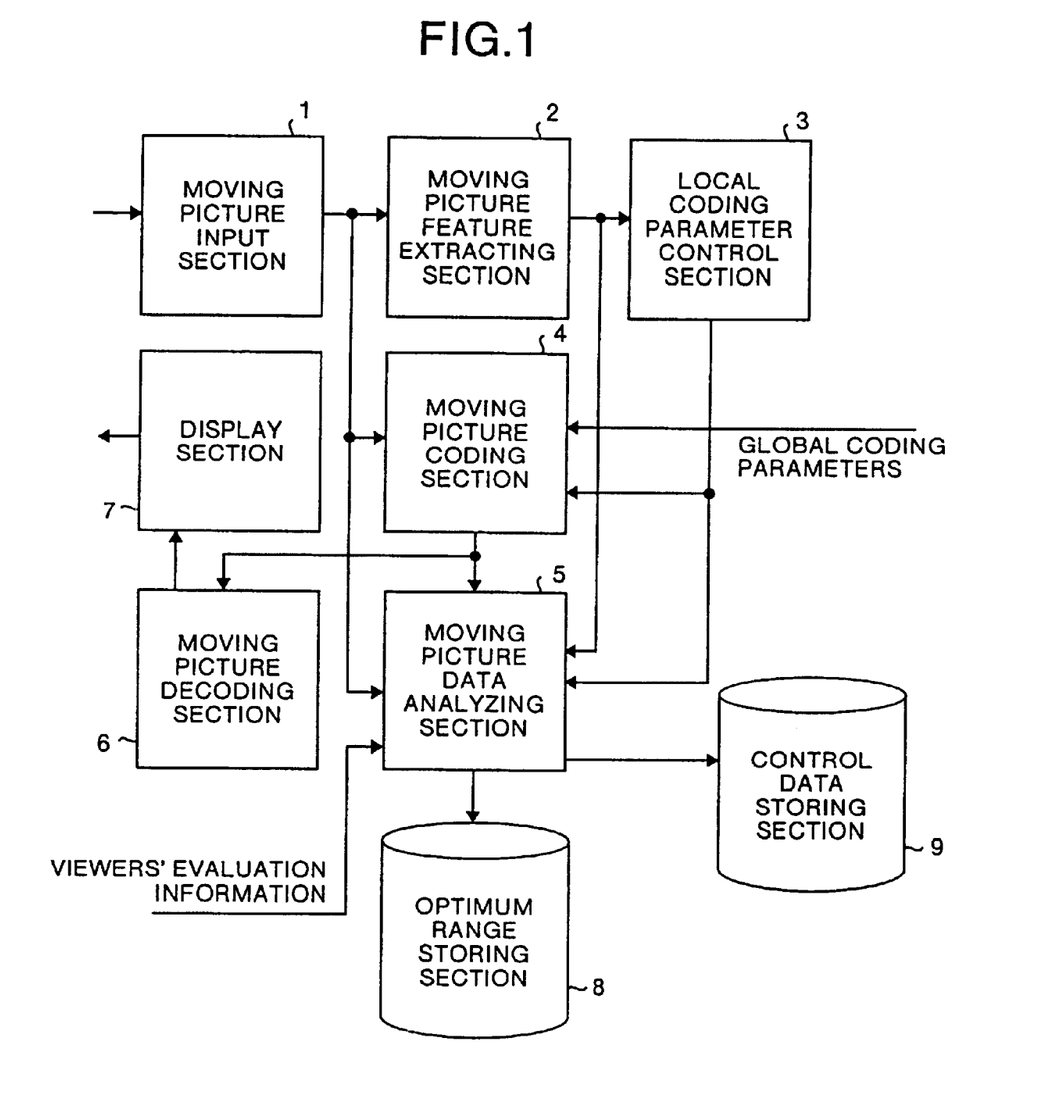
FIG. 1 is a block diagram which shows a structure of a coding control database generating apparatus according to an embodiment of the present invention.

FIG. 1 is a block diagram which shows an embodiment of a coding control database generating apparatus. In this coding control database generating apparatus, a most basic profile called a simple profile in the MPEG-4 will be used as the coding system.

This coding control database generating apparatus comprises a moving picture input section 1, a moving picture feature extracting section 2, a local coding parameter control section 3, a moving picture coding section 4, a moving picture data analyzing section 5, a moving picture decoding section 6, a display section 7, an optimum range storing section 8, and a control data storing section 9.

The moving picture input section 1 divides a sample picture data before coding that has been input from an image pickup camera or a computer, into frames and further into blocks. The moving picture input section 1 then outputs the sample picture data divided into the blocks, to the moving picture feature extracting section 2, the moving picture coding section 4, and the moving picture data analyzing section 5. The moving picture feature extracting section 2 calculates a local feature such as the motion vector based on the block data input from the moving picture input section 1. The moving picture feature extracting section 2 outputs the calculated local feature to the local coding parameter control section 3 and the moving picture data analyzing section 5. The local coding parameter control section 3 obtains local coding parameters such as a quantization level and a macro block type based on the local features output from the moving picture feature extracting section 2. The local coding parameter control section 3 outputs the obtained local coding parameters to the moving picture coding section 4 and the moving picture data analyzing section 5.

The moving picture coding section 4 uses, as input data, the local coding parameters that are input from the local coding parameter control section 3, the global coding parameters that are input from the outside, and block data that is input from the moving picture input section 1. The moving picture coding section 4 encodes the block data in the MPEG-4 simple profile, using the global coding parameters and the local coding parameters. The moving picture coding section 4 outputs the coded data to the moving picture data analyzing section 5 and the moving picture decoding section 6. The moving picture decoding section 6 decodes the coded data for each block from the moving picture coding section 4 in the MPEG-4 simple profile, and outputs the decoded moving picture data for each block.

The display section 7 accumulates the decoded moving picture data that has been input as blocks. The display section 7 displays the decoded moving picture after the decoded moving picture data has been accumulated for one frame. For the display section 7, a plurality of different kinds of display sections are prepared such as CRT and TFT type LCD's, STN type LCD's, low-temperature polysilicone type LCD's, and plasma displays. These display sections enable viewers to monitor the coded moving pictures using various types of display units which have different characteristics. In the present specification, the "characteristics of display unit" refers to types and screen sizes. It is possible to change over between the plurality of types of display units. A plurality of the same type of display units have different screen sizes. This makes it possible to change over between display units having different screen sizes.

The moving picture data analyzing section 5 obtains a plurality of moving pictures by variously changing the local features from the moving picture feature extracting section 2, the local coding parameters from the local coding parameter control section 3, and the global coding parameters of the sample moving picture data. A plurality of viewers monitor the obtained plurality of moving pictures. The moving picture data analyzing section 5 executes a statistical analysis according to probability distributions based on the evaluation information collected from these viewers, and obtains optimized ranges of the global coding parameters. The moving picture data analyzing section 5 obtains an ideal decoded moving picture from a result of the monitoring by the plurality of viewers, based on the evaluation information from the viewers, the local features, and the local coding parameters. Then, the moving picture data analyzing section 5 obtains a quantitative relationship that shows certainty between the local features and the local coding parameters for each block of each frame included in this ideal decoded picture. Finally, the moving picture data analyzing section 5 obtains optimum relationships between the local features and the local coding parameters for each global coding parameter, based on the quantitative relationship that shows the certainty. The details will be explained later.

The optimum range storing section 8 stores optimum ranges of the global coding parameters obtained in the moving picture data analyzing section 5, by type of display unit and by screen size of display unit.

The control data storing section 9 stores a plurality of optimum relationships between the local features and the local coding parameters obtained in the moving picture data analyzing section 5, for each optimum range of global coding parameters. In other words, in the control data storing section 9, each one optimum range of local coding parameters is prepared by type of display unit and by screen size of display unit. A plurality of sets of optimum relationships between the local feature and the local coding parameter are stored in the optimum range of one global coding parameter.

Figure 4:
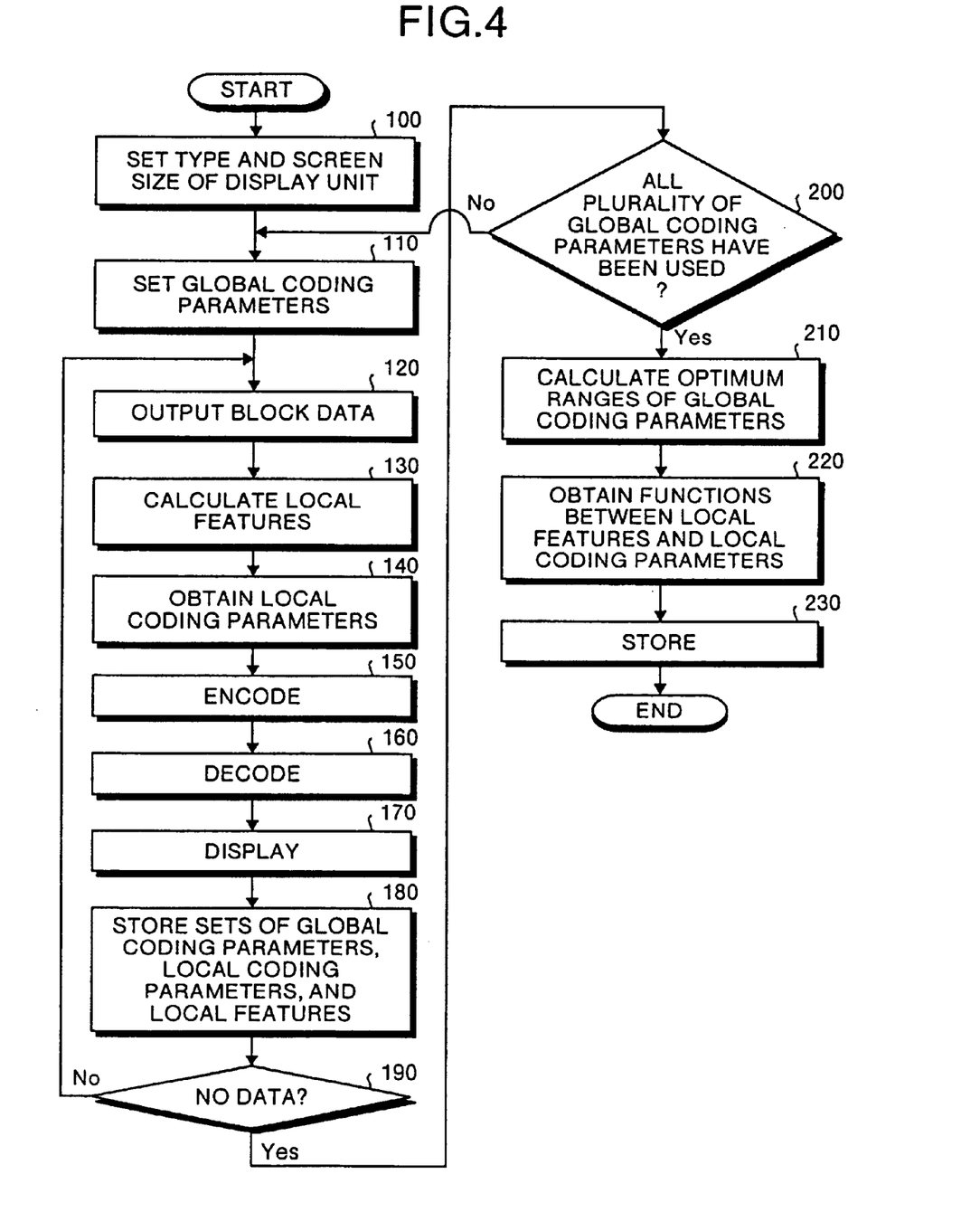
FIG. 4 is a flowchart which shows the operation of the coding control database generating apparatus shown in FIG. 1.

The operation of the coding control database generating apparatus that generates a control database of the coding parameters based on the input of the sample moving picture data, will be explained with reference to FIG. 4.

A display unit of a predetermined type and a predetermined screen size is selected as a display unit of the display section 7 that displays coded/decoded sample moving picture data to viewers (step 100). Next, global coding parameters (frame rate fps, data rate bps, and resolution) for coding this time are set to predetermined values respectively (step 110). Coding/decoding of the sample moving picture is executed by using the global coding parameters set this time.

The moving picture input section 1 divides the sample moving picture data into frames and further into blocks. The moving picture input section 1 outputs the sample moving picture data divided into blocks to the moving picture feature extracting section 2, the moving picture coding section 4, and the moving picture data analyzing section 5 (step 120).

The moving picture feature extracting section 2 calculates the local features such as the motion vector based on the block data input from the moving picture input section 1. The moving picture feature extracting section 2 outputs the calculated local features to the local coding parameter control section 3 and the moving picture data analyzing section 5 (step 130).

The local coding parameter control section 3 obtains the local coding parameters such as the quantization level and the macro block type based on the local features output from the moving picture feature extracting section 2. The local coding parameter control section 3 outputs the obtained local coding parameters to the moving picture coding section 4 and the moving picture data analyzing section 5 (step 140).

The moving picture coding section 4 uses, as input data, the local coding parameters that are input from the local coding parameter control section 3, the global coding parameters that are input from the outside, and block data that is input from the moving picture input section 1. The moving picture coding section 4 encodes the block data in the MPEG-4 simple profile, using the global coding parameters and the local coding parameters. Then, the moving picture coding section 4 outputs the coded data to the moving picture data analyzing section 5 and the moving picture decoding section 6 (step 150).

The moving picture decoding section 6 decodes the coded data for each block from the moving picture coding section 4 in the MPEG-4 simple profile, and outputs the decoded moving picture data for each block (step 160).

The selected display unit in the display section 7 accumulates the decoded moving picture data that has been input as blocks. When the decoded moving picture data has been accumulated for one frame, the display section 7 displays the decoded moving picture (step 170). One or a plurality of viewers monitor the display.

The moving picture data analyzing section 5 relates local features of each block from the moving picture feature extracting section 2 to local coding parameters of each block from the local coding parameter control section 3, corresponding to the global coding parameter assigned this time. The moving picture data analyzing section 5 sequentially accumulates the sets of related data in a memory not shown (step 180).

The series of processing at steps 120 to 180 are repeated until when all frames and all blocks of the sample moving picture data to be coded have been processed (step 190).

Global coding parameters (frame rate fps, data rate bps, and resolution) for executing the coding next time are set to separate values respectively (step 110). The series of processing at steps 120 to 190 are repeated by using the changed global coding parameters. The moving picture data analyzing section 5 relates the local features of each block from the moving picture feature extracting section 2 to the local coding parameters of each block from the local coding parameter control section 3, corresponding to the global coding parameter assigned this time by changing the global coding parameter from the last assignment. The moving picture data analyzing section 5 sequentially accumulates the sets of related data.

The above processing is repeated by variously changing the global coding parameters (step 200). With the above arrangement, it is possible to accumulate in the memory of the moving picture data analyzing section 5, sets of a relationship between a local feature of each block and a local coding parameter of each block relating to a predetermined type of display unit having a predetermined screen size, for each of a plurality of different global coding parameters.

The moving picture data analyzing section 5 obtains an optimum range of global coding parameters, and a relationship between the local coding parameter and the local feature that are necessary to optimize a range of global coding parameters, based on the accumulated data and opinions from a plurality of users (evaluation information that shows the evaluation of the monitoring this time, from each viewer) (steps 210 and 220). This processing will be explained in detail later.

The optimum range storing section 8 stores the optimum range of the global coding parameters obtained in the moving picture data analyzing section 5, by type and by screen size of display units (step 230). The control data storing section 9 stores a plurality of optimum sets of relationships between the local features and the local coding parameters obtained in the moving picture data analyzing section 5, by relating them to the optimum range of global coding parameters (step 230).

In this way, one database preparation processing finishes that includes the optimum range of global coding parameters relevant to a predetermined type of display unit having a predetermined screen size set at step 100 (stored in the optimum range storing section 8), and a plurality of optimum sets of relationships between the local features and the local coding parameters related to the optimum range of global coding parameters (stored in the control data storing section 9).

The series of processing at steps 100 to 230 are executed by changing the characteristics of display units of the display section 7, that is, types and screen sizes of display units, and by using evaluation information of viewers who have carried out the monitoring using the display units of the changed characteristics. Based on this, the next database is prepared. In this instance, this next database is prepared by using display units of different screen sizes even though the type of the display unit is the same, and by using the evaluation information of viewers who have carried out the monitoring using these display units.

In this way, a series of similar processing are executed by variously changing screen sizes of the display units of the same type of display unit. A plurality of databases are prepared for a plurality of the same type of display units each having a different screen size.

The type of display unit of the display section 7 is changed, and a series of similar processing are executed by variously changing screen sizes of the display units of the same type of display unit. A plurality of databases are prepared for the next type of display units in this way.

By repeating the above series of processing, a plurality of databases are prepared that include optimum ranges of global coding parameters, and a plurality of optimum sets of relationships between local features and local coding parameters, for each of a plurality of different types of display units having different screen sizes.

Figure 6:
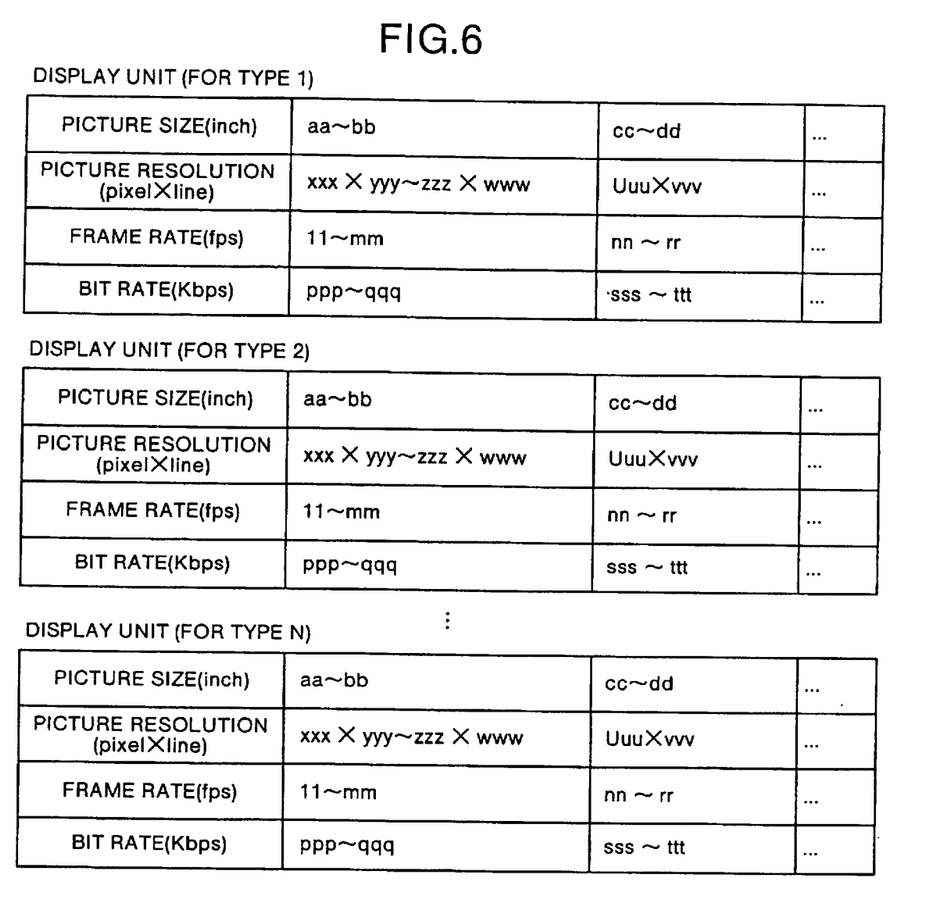
FIG. 6 is a diagram which shows an example of the memory contents of an optimum range storing section.

FIG. 6 shows one example of memory contents of the optimum range storing section 8. In FIG. 6, the top table shows optimum ranges of global coding parameters (picture resolution, frame rate, and bit rate, in this instance) of a display unit of a type 1. In this table, optimum ranges of global coding parameters are registered for each of a plurality of different ranges of screen sizes. The middle table shows optimum ranges of global coding parameters of a display unit of a type 2. In this table, optimum ranges of global coding parameters are registered for each of a plurality of different ranges of screen sizes. The bottom table shows optimum ranges of global coding parameters of a display unit of a type N. In this table, optimum ranges of global coding parameters are registered for each of a plurality of different ranges of screen sizes.

Figure 7:
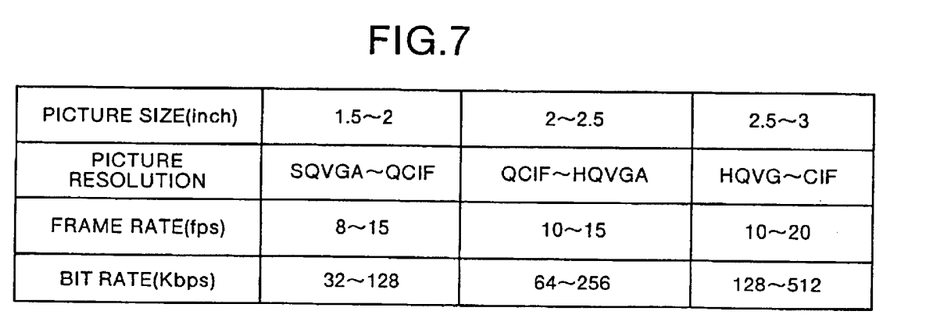
FIG. 7 is a diagram which shows an example of an optimization range of global coding parameters.

FIG. 7 shows optimum ranges of global coding parameters when TFT type LCD's are used as display units, and the MPEG-4 simple profile is used as the coding/decoding system.

Referring to FIG. 7, when the picture size is between 1.5 to 2 inches, an optimum range of picture resolution is from SQVGA (160×120) to QCIF (174×144). An optimum range of frame rate is from 8 to 15 fps, and an optimum range of bit rate is from 32 to 128 kbps. When the picture size is between 2 to 2.5 inches, an optimum range of picture resolution is from QCIF to HQVGA (240×176). An optimum range of frame rate is from 10 to 15 fps, and an optimum range of bit rate is from 64 to 256 kbps. Further, when the picture size is between 2.5 to 3 inches, an optimum range of picture resolution is from HQVGA to CIF (352× 288). An optimum range of frame rate is from 10 to 20 fps, and an optimum range of bit rate is from 128 to 512 kbps. In the above ranges of numerical values, "XXX-YYY" means "equal to or greater than XXX and less than YYY". For example, "1.5–2 inches" means "equal to or greater than 1.5 inches and less than 2 inches".

Figure 8:
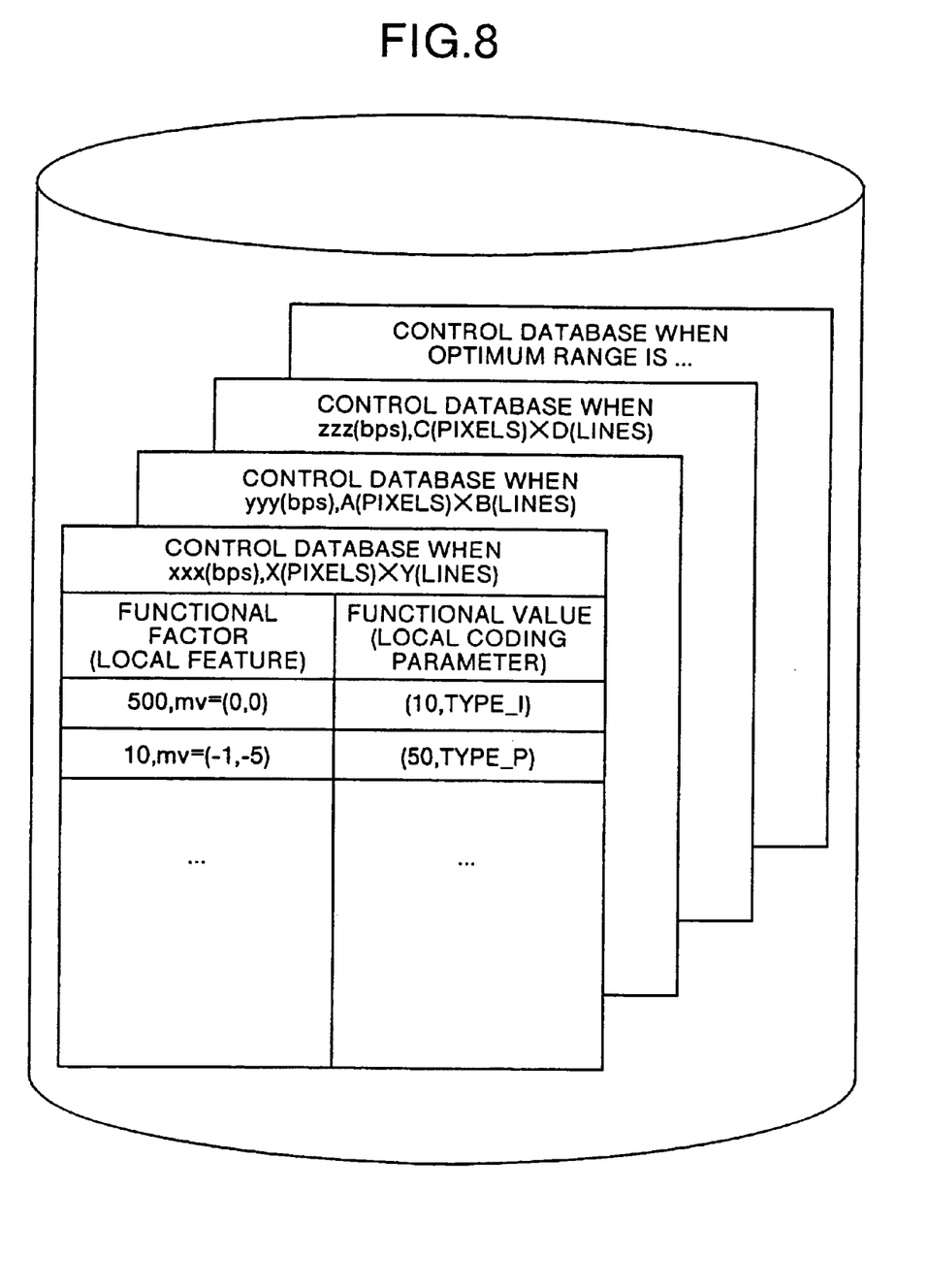
FIG. 8 is a diagram which explains the memory contents of a control data storing section.

FIG. 8 shows a part of memory contents of the control data storing section 9. This shows a plurality of optimum sets of relations between local features and local coding parameters that are relevant to an optimum range of global coding parameters corresponding to a certain type of display unit of one screen size. Therefore, a plurality of sets of relationships as shown in FIG. 8 are registered by a plurality of numbers for each optimum range of global coding parameters, in the control data storing section 9. As explained above, optimum ranges of global coding parameters are prepared corresponding to the number of plurality of different types of display units each having a different screen size. Therefore, in the control data storing section 9, a plurality of optimum sets of relationships between the local features and the local coding parameters are set for the plurality of different types of display units each having a different screen size.

In FIG. 8, two parameters of bit rate and picture resolution are used as global coding parameters. A plurality of optimum sets of relationships between the local features and the local coding parameters are prepared for each combination of these two parameters.

Figure 5:
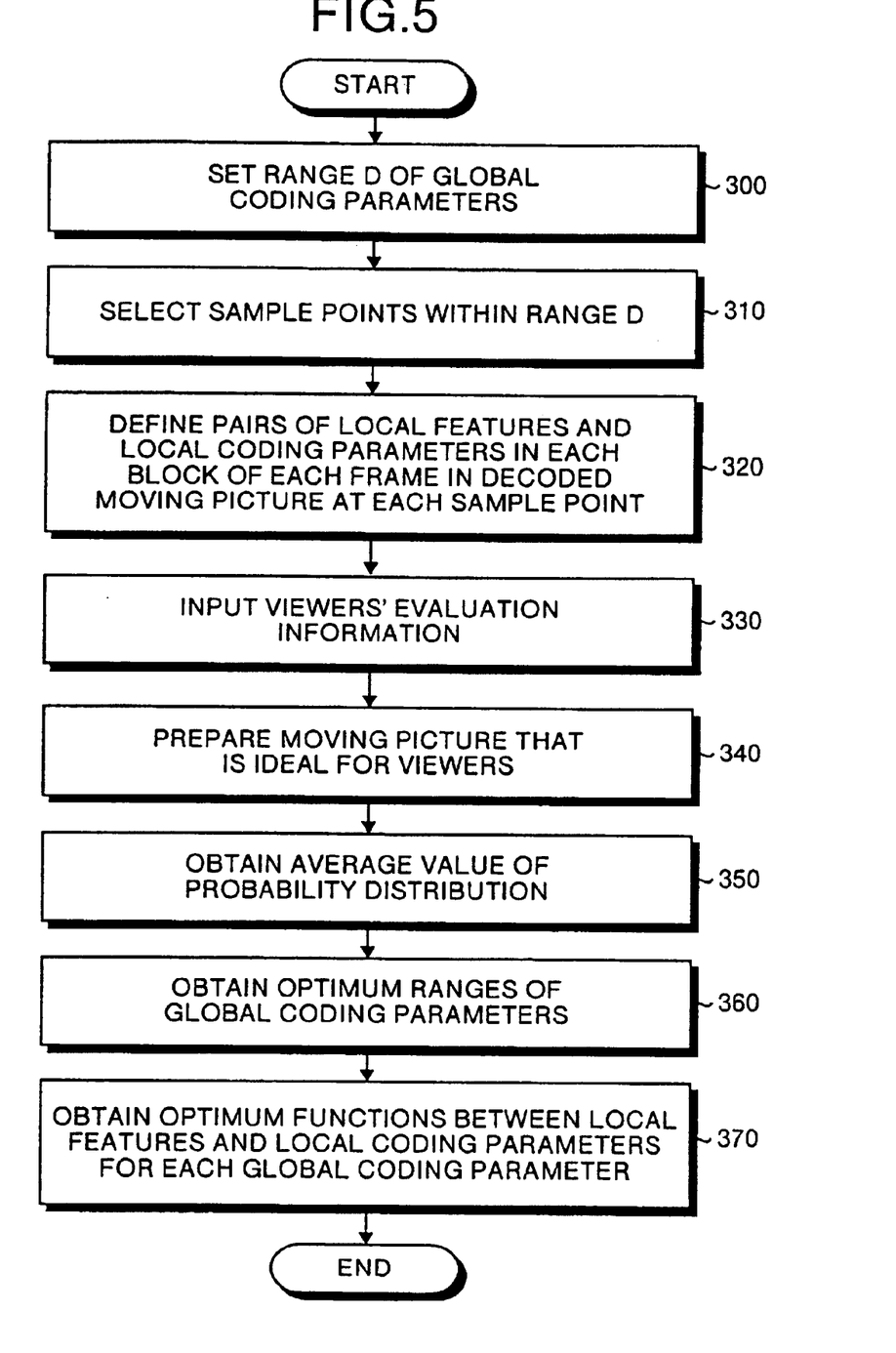
FIG. 5 is a flowchart which shows the operation of a moving picture data analyzing section of the coding control database generating apparatus shown in FIG. 1.

The concept of the processing carried out by the moving picture data analyzing section 5 at steps 210 and 220 in FIG. 4 will be explained with reference to a flowchart shown in FIG. 5.

A range D of global coding parameters is set (step 300) Usually, D is under certain constraint. Assume that picture resolution and frame rate are selected as global coding parameters, for example. Usually, an aspect ratio that represents the resolution of an input picture is fixed as c in the horizontal direction and d in the vertical direction. When the scalar rate is r, only c×d (pixel×line) times the scalar rate r is permitted for the resolution. The frame rate (fps) is also permitted to up to a certain upper limit because of the performance of the encoder. Therefore, D takes all (r, f) that satisfies the constraints of r and f. (r, f) is a set of combination of r and f.

Assume that sample points are selected at random within the range D, and a set of selected points is expressed as P=[p0, p1, . . . , pn−1] ⊂D (step 310). It is necessary to select several points, and an optional random number generation algorithm may be used for this selection. The selected number of points is expressed as #P. Various kinds of global coding parameters that are externally input at step 110 are determined by using the selected sample points P=[p0, p1, . . . , pn−1].

Regarding each of n sample points p=(r, f) ∈P, a sample moving picture data Io is encoded using a bit rate B(bps), a frame rate f (fps), and a resolution c×r×d×r (pixel×line). A decoded moving picture data is expressed as I (p).

A parameter M is defined. This parameter M is an area of a combination b=(q, t) ∈M, where t represents a time (corresponding to a frame number) during which period a frame is displayed, and q represents a block position in the frame. #M represents the number of blocks of all frames.

A pair of a local feature and a local coding parameter (a moving picture feature, and a local coding parameter) for coding in the block q of the frame t in each coded moving picture I (p) are defined using I (p) (b), where b=(q, t) ∈M. According to I (p) (b), sets of local features for each block from the moving picture feature extracting section 2 and local coding parameters for each block from the local coding parameter control section 3 are related to each global coding parameter.

Evaluation information from a plurality of viewers based on the monitoring this time is input (step 330). In the monitoring, one or a plurality of viewers are requested to watch as far as possible a plurality of sample moving pictures I (p) (p∈P) that are obtained by changing global coding parameters using sample points P=[p0, p1, ..., pn−1], in the status that a type and a screen size of display unit are fixed. The viewers are asked to specify what portion of what decoded moving picture I (p) is preferable. This monitoring is carried out repeatedly by changing types and screen sizes of display units.

A set of viewers is expressed as S={α, β, γ, ... }, and the number of viewers is expressed as #S. Each viewer is requested to watch as far as possible all sample moving pictures I (p) (p∈P) that are obtained by changing global coding parameters. The viewers are asked to specify what portion of what decoded moving picture I (p) is preferable. For example, k, l, m, and n ∈ are set.

Each viewer presents the following opinions, for example. "The best decoded moving picture is I (k), but I (l) is better regarding this area in the screen."

"The moving picture of I (m) is best from the start up to this time, but the moving picture of I (n) is better from this time."

"There is little difference between this portion of I (l) and this portion of I (m)." The viewers may not be real persons, and it is possible to obtain evaluations based on mechanical procedures, such as SN ratio calculation results, for example. In this instance, in S=[α], α provides a block of best SN ratio.

The procedure of preparing the best picture data that is ideal for each viewer is executed (step 340). When the evaluation of the viewer α is E(α), this is expressed in the form of determining a probability distribution on P for each x∈M.

$$E(\alpha): M \to \Omega \quad (1)$$

$$\Omega = \left\{ \pi: P \to R \,\middle|\, \left( \sum_{p \in P} \pi(p) = 1 \ ((\pi(p) \geq 0, \ p \in P)) \right) \right\}$$

The evaluation E(α) of the viewer is selected to establish the above expression (1).

The probability distribution of each point x is selected such that the decoded moving picture I (p) that is best for the viewers becomes a large proportion. Assuming E(α)(x) in the block x∈M, when it is not possible to discriminate between n decoded moving pictures, 1 is equally divided, and π (p)=1/n is determined. π that becomes π (q)=0 is defined for other pint q. When the best decoded moving picture is one I (p), and other decoded moving picture I (q) is not good, π that becomesπ (p)=1 and π (q)=0 is defined. Taking the SN ratio of S=[α] as an example, π(p)=1 is determined for p of I (p) of the best SN ratio, and π (q)=0 is determined for q of other I (q). When there are a plurality of p of substantially the same SN ratio, 1 is equally divided by n, and π (p)=1/n is determined, and π (q)=0 is determined for q of other I (q).

An average value of a probability distribution on P is obtained (step 350). In other words, a probability distribution ρ∈Ω on P is obtained from the following expression (2) based on the evaluation E(α)(α∈T) of the viewers.

$$\rho = \frac{1}{\#M} \sum_{X \in M} \frac{1}{\#S} \sum_{\alpha \in M} E(\alpha)(x) \quad (2)$$

An optimized center (an average value) c is obtained from the following expression (3).

$$c = \sum_{p \in P} \rho(p) p \quad (c \in D) \quad (3)$$

Based on the optimized center c, a minimum square area G=[c0−ϵ0, c0+ϵ0]×[c1−ϵ1, c1+ϵ1] (in this instance, a two-dimensional square area, as two global coding parameters are used) that satisfies the following expression (4) is set as an optimum range of global coding parameters.

$$\sum_{p \in R \cap P} \rho(p) > 0.8 \quad (4)$$

Optimum ranges of global coding parameters obtained above are stored in the optimum range storing section 8 in the forms shown in FIG. 6 and FIG. 7 respectively (step 360).

A quantitative relationship that shows certainty between the local features and the local coding parameters is obtained for the whole moving picture blocks that are included in the decoded moving pictures that have been evaluated as ideal by the viewers. Optimum sets of relationships between the local features and the local coding parameters are obtained based on each optimum range of each global coding parameter (step 370).

In other words, a level evI (p, b) shown in the following expression (5) is obtained for the relationship {I (p) (b): p∈P, b∈M} between the features and local coding parameters of all decoded moving picture blocks, by using the decoded moving picture {E(α):α∈T} that has been obtained as ideal by the viewers.

$$evI(p, b) = \frac{1}{\#T} \sum_{\alpha \in T} E(\alpha)(b)(p) \quad (5)$$

The level evI (p, b) shows certainty of I (p) (b) of the relationship between the features and the local coding parameters. When this value evI (p, b) is larger, this shows that the relationship between the features and the local coding parameters appears more easily in the optimized moving picture blocks. When this value evI (p, b) is smaller, this shows that the relationship between the features and the local coding parameters less appears in the optimized moving picture blocks. In other words, when evI (p, b) is larger, this shows that many viewers have evaluated the corresponding moving picture block as satisfactory.

In general, there is a certain (functional) relationship between the moving picture features and the coding parameters of a block of a moving picture that is to be coded. It is possible to obtain this relationship by collecting a large quantity of data, and extracting this relationship by statistically processing the data. In general, there have been known several statistical methods for collecting a large quantity of data, eliminating noise components, and extracting essential relationships. According to these methods, portions that have casual relationships and portions that do not have relationships are extracted separately, and casual (functional) relationships are taken out from the portions having these relationships. It is convenient to regard that no values have been defined in portions of functional defined areas that do not have casual relationships according to these methods.

The moving picture coding apparatus of the present invention collects information relating to many blocks by coding a sample moving picture, and obtains a quantitative relationship that shows certainty of relationships between features and local coding parameters in the form of evI (p, b). Therefore, based on the application of the above statistical methods, it is possible to obtain functional relationship by extracting the relationships between the features and the local coding parameters for which the values of evI (p, b) are large.

The functions between the features and the local coding parameter, that is, a plurality of optimum sets of relationships between the local features and the local coding parameters obtained above, are stored in the control data storing section 9 as the local coding control database, by relating these relationships to the optimum ranges of the global coding parameters obtained at step 360 in the format shown in FIG. 8.

As explained above, according to this coding control database generating apparatus, it is possible to obtain optimum ranges of global coding parameters to enable a reproduction of a moving picture that reflects characteristics of display units and opinions from a plurality of users. Further, it is possible to obtain optimum sets of relationships between the local features and the local coding parameters that are necessary to optimize ranges of the global coding parameters, for each global coding parameter. With this arrangement, it is possible to realize a database that stores coding parameters for making it possible to reproduce a moving picture of satisfactory picture quality by reflecting the opinions from a plurality of users.

The viewers' evaluation information after carrying out the monitoring may be stored in a suitable memory, and the moving picture data analyzing section 5 may analyze the data stored in this memory.

Figure 10:
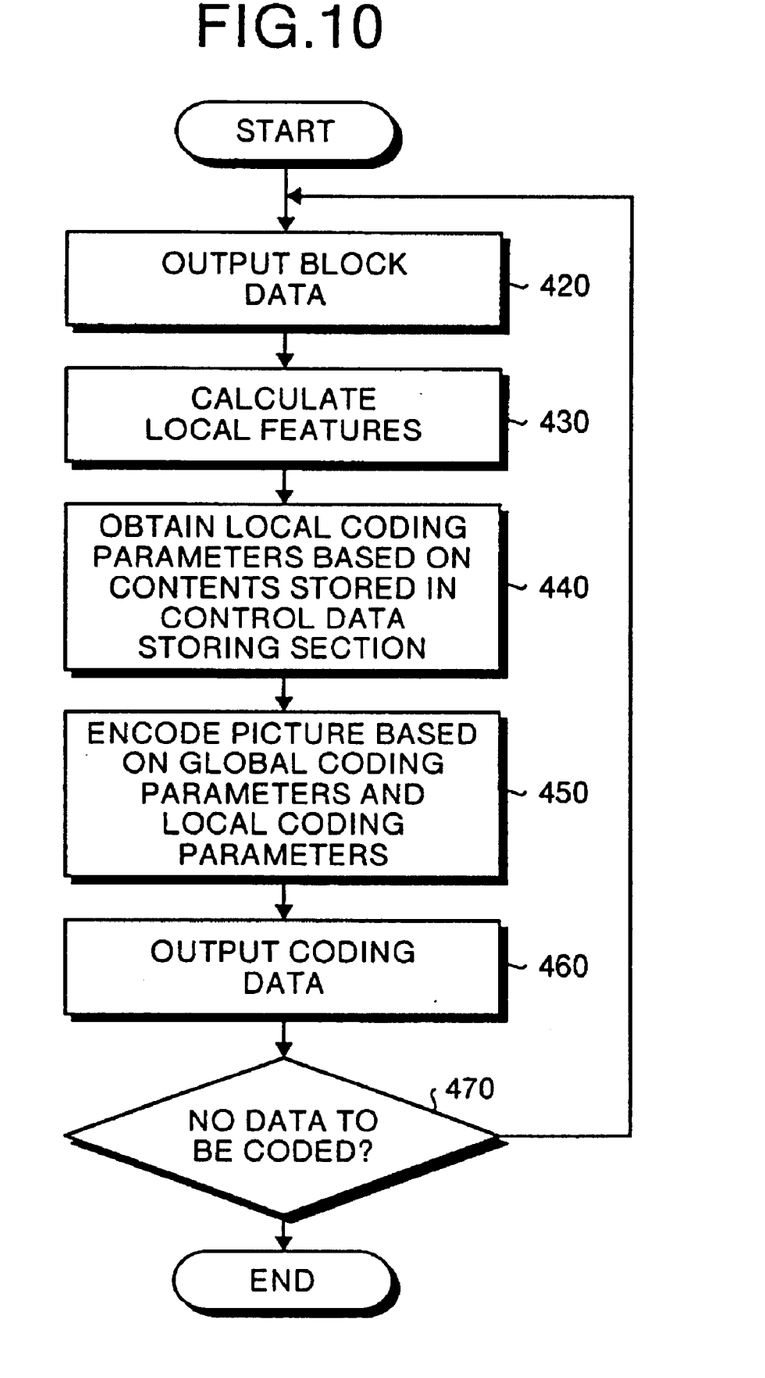
FIG. 10 is a flowchart which shows the operation of the moving picture coding control apparatus shown in FIG. 9.
Figure 11:
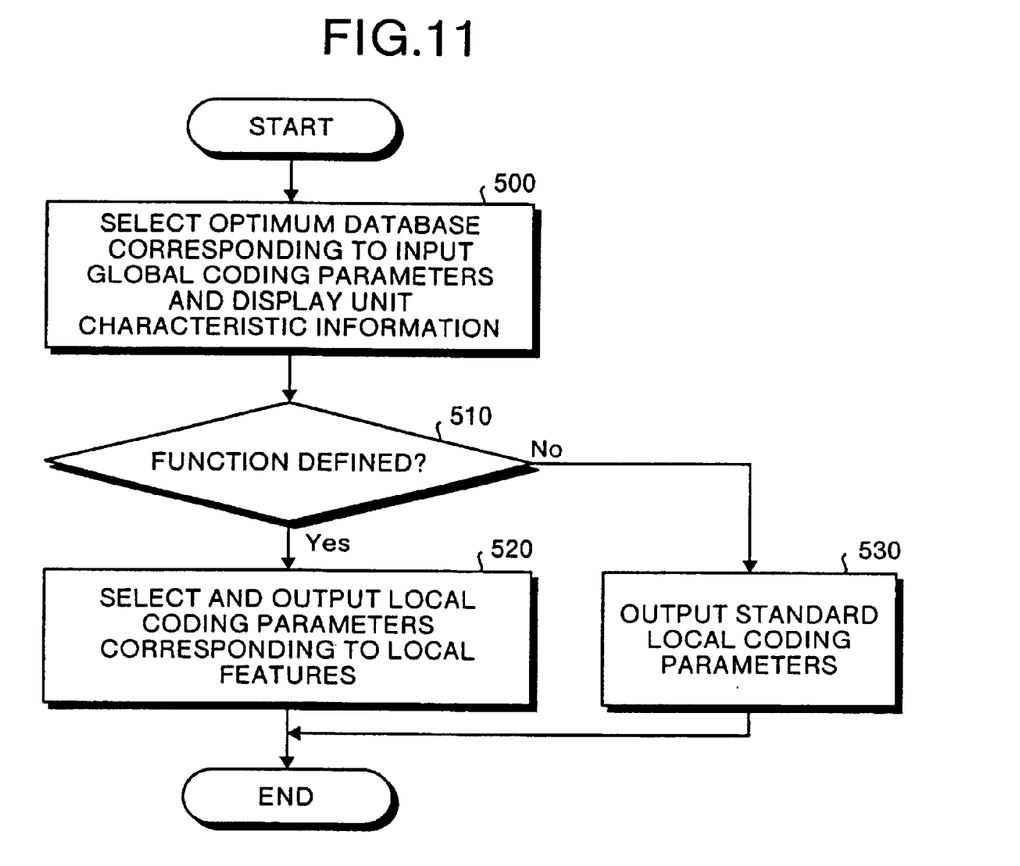
FIG. 11 is a flowchart which shows the operation of an optimum local coding parameter control section of the moving picture coding control apparatus shown in FIG. 9.

Embodiments of a moving picture coding control apparatus will be explained next with reference to FIG. 9 to FIG. 11. It is assumed that, in this moving picture control apparatus, a most basic profile called a simple profile in the MPEG-4 will be used as the coding system.

Figure 9:
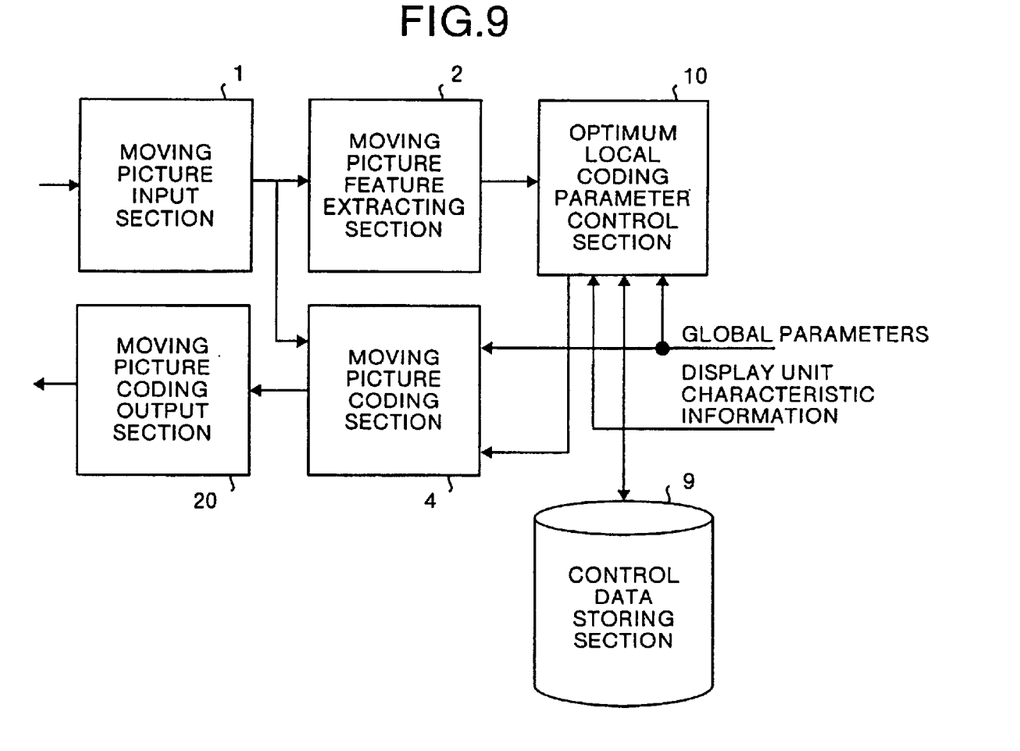
FIG. 9 is a block diagram which shows a structure of a moving picture coding control apparatus according to an embodiment of the present invention.

FIG. 9 is a block diagram which shows an embodiment of a moving picture coding control apparatus. This moving picture coding control apparatus comprises a moving picture input section 1, a moving picture feature extracting section 2, a moving picture coding section 4, a control data storing section 9, an optimum local coding parameter control section 10, and a moving picture coding output section 20. Constituent elements that achieve functions identical to those of the constituent elements shown in FIG. 1 will be attached with like reference numerals.

The operation of the moving picture coding control apparatus shown in FIG. 9 will be explained with reference to flowcharts shown in FIG. 10 and FIG. 11.

The moving picture input section 1 divides an optional moving picture data before coding that has been input from an image pickup camera or a computer, into frames and further into blocks. The moving picture input section 1 then outputs the moving picture data divided into the blocks, to the moving picture feature extracting section 2 and the moving picture coding section 4 (step 420). The moving picture feature extracting section 2 calculates a local feature such as the motion vector based on the block data input from the moving picture input section 1, and outputs the calculated local feature to the optimum local coding parameter control section 10 (step 430).

The optimum local coding parameter control section 10 obtains optimum local coding parameters, based on global coding parameters and display unit characteristic information input from the outside, moving picture local features output from the moving picture feature extracting section 2, and information output from the local coding control database of the control data storing section 9 respectively. The optimum local coding parameter control section 10 outputs the obtained local coding parameters to the moving picture coding section 4 (step 440). The control data storing section 9 stores the local coding control database that has been prepared by the moving picture coding control database generating apparatus shown in FIG. 1.

The operation of the optimum local coding parameter control section 10 will be explained in further detail with reference to FIG. 11.

As explained with reference to FIG. 8, in the control data storing section 9, a plurality of optimum sets of relationships between the local features and the local coding parameters have been registered corresponding to a plurality of global coding parameters for a plurality of different kinds of display units each having a different screen size. The optimum local coding parameter control section 10 searches for data stored in the control data storing section 9 based on global coding parameters and display unit characteristic information that have been input from the outside. Based on this, the optimum local coding parameter control section 10 selects a local coding control database in which types of display units coincide with each other and screen sizes coincide with each other. Further, the local coding parameter control section 10 selects a set of relationships between the local features and the local coding parameters that correspond to the input global coding parameters from among the plurality of sets of relationships (step 500).

The optimum local coding parameter control section 10 decides whether the local coding parameters (functional values) corresponding to the local features input from the moving picture feature extracting section 2 have been defined or not in the selected set of relationships between the local features and the local coding parameters (step 510).

When the local coding parameters corresponding to the input local features have been defined, the optimum local coding parameter control section 10 obtains the local coding parameters corresponding to the input local features, and outputs the obtained local coding parameters to the moving picture coding section 4 (step 520). When the functions have not yet been defined, the optimum local coding parameter control section 10 determines the local coding parameters by using global coding parameters and the process of standard local coding parameters corresponding to local features. The optimum local coding parameter control section 10 outputs the determined local coding parameters to the moving picture coding section 4 (step 530).

The moving picture coding section 4 uses, as input data, the local coding parameters that are input from the optimum local coding parameter control section 10, the global coding parameters that are input from the outside, and the block data that is input from the moving picture input section 1. The moving picture coding section 4 encodes the block data in the MPEG-4 simple profile, using the global coding parameters and the local coding parameters. The moving picture coding section 4 outputs the coded data to the moving picture coding output section 20 (step 450 in FIG. 10).

The moving picture coding output section 20 accumulates the input moving picture coded data in the memory unit, converts this data into data of a format that can be transmitted to the communication line, and outputs this converted data (step 460).

The series of processing at steps 420 to 460 are repeated until when all frame data and all block data of the sample moving picture data to be coded have been processed (step 470).

As explained above, according to this moving picture coding control apparatus, for each optimum range of global coding parameters that make it possible to reproduce a moving picture reflecting characteristics of display units which display the moving picture data and opinions from a plurality of users, the coding control data storing section stores optimum sets of relationships between the local features and the local coding parameters that are necessary to optimize ranges of the global coding parameters. Further, local coding parameters that are optimum for global coding parameters and local coding parameters are sequentially selected, by using the stored data. The moving picture data is encoded based on the selected local coding parameters. Therefore, it is possible to reproduce a moving picture of satisfactory picture quality by reflecting the characteristics of the display unit and the opinions from a plurality of users.

As explained above, according to the moving picture coding control apparatus of the present invention it is possible to reproduce a moving picture of satisfactory picture quality by reflecting the characteristics of the display unit and the opinions from a plurality of users.

Moreover, it is possible to reproduce a moving picture of satisfactory picture quality more faithfully and in high precision by reflecting the opinions from a plurality of users.

Furthermore, it is possible to obtain optimum ranges of global coding parameters for enabling a reproduction of a moving picture of satisfactory picture quality more faithfully and in high precision by reflecting the opinions from a plurality of users and characteristics of display units.

Moreover, it is possible to obtain optimum relationships between local features and local coding parameters for enabling a reproduction of a moving picture of satisfactory picture quality more faithfully and in high precision by reflecting the opinions from a plurality of users and characteristics of display units.

Furthermore, it is always possible to reproduce a moving picture of satisfactory quality even if types of display units and screen sizes of display units are different.

Moreover, it possible to reproduce a moving picture of satisfactory picture quality by reflecting characteristics of display units and the opinions from a plurality of users.

According to the moving picture coding control database generating apparatus of the present invention, it is possible to obtain optimum ranges of global coding parameters for enabling a reproduction of a moving picture that reflects the opinions from a plurality of users. It is also possible to obtain optimum sets of relationships between the local features and the local coding parameters that are necessary to optimize ranges of the global coding parameters, for each global coding parameter. Therefore, it is possible to obtain a database that stores coding parameters for enabling a reproduction of a moving picture of satisfactory picture quality by reflecting the opinions from a plurality of users.

Moreover, it is possible to obtain a database that stores coding parameters for enabling a reproduction of a moving picture of satisfactory picture quality by reflecting a difference in types and/or screen sizes of display units and the opinions from a plurality of users.

Furthermore, it is possible to realize a database that stores coding parameters enabling a reproduction of a moving picture of satisfactory picture quality by reflecting a difference in types and/or screen sizes of display units and opinions from a plurality of users.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A moving picture coding control apparatus comprising:
   a coding control data storing unit in which optimum ranges of global coding parameters are set corresponding to each of a plurality of characteristics of display units which display moving pictures, and which stores a plurality of optimum sets of relationships between local features and local coding parameters for each optimum range of the set global coding parameters;
   a moving picture input unit to which moving picture data is input;
   a moving picture feature extracting unit that analyzes moving picture data that has been input to the moving picture input unit, and extracts local features of a moving picture;
   an optimum local coding parameter control unit to which display unit characteristic information that shows characteristics of display units and global coding parameters is input, which selects optimum ranges of global coding parameters corresponding to the input display unit characteristic information from the coding control data storing unit, selects relationships corresponding to the input global coding parameters from the plurality of sets of relationships corresponding to the selected optimum ranges of global coding parameters, selects local coding parameters corresponding to the local features extracted by the moving picture feature extracting unit by using the selected relationships, and outputs the selected local coding parameters;
   a moving picture coding unit that encodes the moving picture data input from the moving picture input unit based on the local coding parameters output from the optimum local coding parameter control unit and the input global coding parameters; and
   a moving picture coding output unit that outputs the moving picture data coded by the moving picture coding unit.

2. The moving picture coding control apparatus according to claim 1, wherein
   the optimum ranges of global coding parameters and the relationships between the local features and the local coding parameters that are stored in the coding control data storing unit are set using a statistical processing based on a result of investigation in viewers monitoring.

3. The moving picture coding control apparatus according to claim 1, wherein
   the optimum ranges of global coding parameters that are stored in the coding control data storing unit are obtained through the execution of monitoring by a plurality of viewers of a plurality of moving pictures by variously changing global coding parameters and also by variously changing characteristics of display units, and the executing of a statistical processing of a result of the monitoring according to probability distributions.

4. The moving picture coding control apparatus according to claim 1, wherein a quantitative relationship that shows certainty between the local features and the local coding parameters is obtained for the whole moving picture blocks that are included in the decoded moving pictures that have been evaluated as ideal from the result of monitoring by a plurality of viewers, and the optimum relationships between the local features and the local coding parameters that are stored in the coding control data storing unit are obtained based on this quantitative relationship that shows certainty.

5. The moving picture coding control apparatus according to claim 1, wherein the display unit characteristic information includes display unit type identification information that identifies one or both of a type of display unit and screen size identification information that identifies a screen size of a display unit.

6. The moving picture coding control apparatus according to claim 1, wherein the moving picture coding unit carries out the MPEG-4 encoding.

7. A moving picture coding control database generating apparatus comprising:

a moving picture input unit to which sample moving picture data is input;

a moving picture feature extracting unit that analyzes a sample moving picture data that has been input to the moving picture input unit, and extracts local features of a moving picture for each block of each frame;

a local coding parameter control unit that obtains local coding parameters for each block of each frame based on the extracted local features;

a moving picture coding unit to which different global coding parameters are input each time when the coding of sample moving picture data has once been finished, and which encodes the sample moving picture data from the moving picture input unit by using the input global coding parameters and the local coding parameters from the local coding parameter control unit;

a moving picture decoding unit that decodes coded data from the moving picture coding unit;

a display unit that displays coded data from the moving picture decoding unit;

a moving picture data analyzing unit that obtains a plurality of moving pictures by variously changing local features from the moving picture feature extracting unit, local coding parameters from the local coding parameter control unit, and global coding parameters of the sample moving picture data, executes monitoring of the obtained plurality of moving pictures by a plurality of viewers thereby to obtain evaluation information from each viewer, executes a statistical processing using users' evaluation information according to probability distributions thereby to obtain optimum ranges of global coding parameters, obtains a quantitative relationship that shows certainty between local features and local coding parameters that are included in a decoded moving picture that is regarded as ideal from a result of the monitoring by the plurality of viewers, based on the viewers' evaluation information, the local features and the local coding parameters, for each block of each frame, and obtains optimum sets of relationships between the local features and the local coding parameters based on the quantitative relationship that shows this certainty, for each global coding parameter; and a coding control data storing unit that stores optimum ranges of global coding parameters obtained by the moving picture data analyzing unit and optimum relationships between the local features and the local coding parameters.

8. The moving picture coding control database generating apparatus according to claim 7, wherein the viewers' evaluation information is input to the moving picture data analyzing unit for each of a plurality of display units of one or both of different types and different screen sizes, and the moving picture data analyzing unit obtains optimum ranges of global coding parameters for each of the plurality of display units of one or both of different types and different screen sizes, and obtains optimum sets of relationships between local features and local coding parameters for each of the plurality of display units of one or both of different types and different screen sizes.

9. The moving picture coding control database generating apparatus according to claim 7, wherein the moving picture coding unit executes the MPEG-4 encoding, and the moving picture decoding unit executes the MPEG-4 decoding.

* * * * *